INVENTORS:
HUGH R.M. CRAIG
CLIFFORD MORRIS
ADOLF FRANKEL
By Babcock & Babcock
ATTORNEYS July 6, 1954

H. R. M. CRAIG ET AL 2,682,991

GAS TURBINE

Filed Jan. 30, 1950

INVENTORS:
HUGH R.M. CRAIG
CLIFFORD MORRIS
ADOLF FRANKEL

By *Babcock & Babcock*
ATTORNEYS

Patented July 6, 1954

2,682,991

UNITED STATES PATENT OFFICE 2,682,991

GAS TURBINE

Hugh Robert Morton Craig, Clifford Morris, and Adolf Frankel, Rugby, England, assignors to The English Electric Company Limited, London, England, a British company Application January 30, 1950, Serial No. 141,216

Claims priority, application Great Britain February 4, 1949

4 Claims. (Cl. 230—116)

1

The invention relates to a development of the gas turbine described in the copending patent application Ser. No. 76,335, filed on February 14, 1949, now abandoned, of Leslie Jack Cheshire, Adolf Frankel and Paul Heinz Walter Wolff (assignors to The English Electric Company Limited), and has the principal object of providing an oil system and a bearing for the compressor rotor and the turbine rotor driving the same which allow the reduction of leakage to atmosphere of the gaseous high pressure medium on both sides of said bearing through the same and through the oil sump thereof.

It is another object of the invention to provide a bearing for the compressor rotor and the turbine rotor driving the same which is safeguarded against the emergence of oil from its ends into the portions of the casing housing the said rotors respectively.

It is yet another object of the invention to provide a lubricating system for the said bearing which is safeguarded against becoming clogged owing to oil foaming or the like.

Other objects of the invention will appear from the description of an embodiment of the invention, and while we are describing a useful example of how the invention can be carried into effect, we wish it to be understood that we do not limit ourselves to the accurate details as shown, for obvious modifications thereof will occur to a person skilled in the art.

Figure 1:
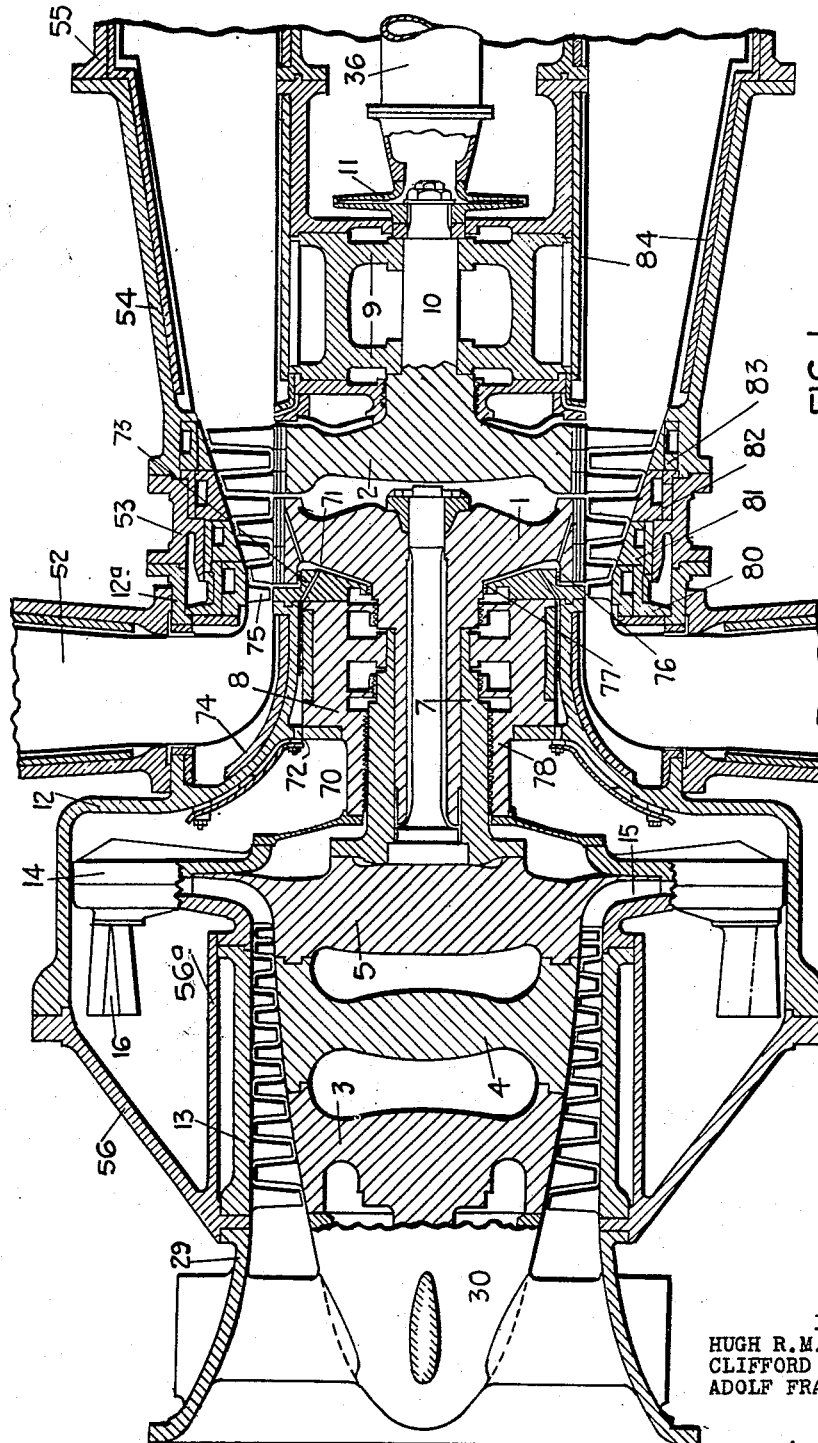
Fig. 1 shows a longitudinal part section on a horizontal plane through a gas turbine set according to the copending patent application Ser. No. 76,335, filed on February 14, 1949, now abandoned.

Referring first to Fig. 1, there are two gas turbine rotors 1 and 2 arranged coaxially but mechanically independent from one another. The power turbine rotor 2 drives the output shaft 36 through a stub shaft 10, journalled in a bearing 9, and a resilient coupling 11. The other turbine rotor 1, drives a compressor rotor composed of the discs 3, 4 and 5 through a tubular shaft 7. This tubular shaft 7 is journalled in a bearing block 8 which will later be described more in detail.

2

The compressor rotor is journalled at its free end in a streamlined casing 30 arranged inside the compressor air intake 29. The compressor stator 13 is arranged inside the inner drum portion 56a of a casing 56 which is flanged to the casing 12 and which contains the diffuser 14, 16 of the last compressor stage 15.

The discharge ducts 52 of the combustion chambers (not shown) are attached to the portion 12a of the casing 12 and supply combustion gases to the first row 75 of stator blades inserted in a blade retaining ring 80. Other rows of stator blades are inserted in blade retaining rings 81, 82 and 83 contained in the casing portions 53 and 54, respectively. The latter is heat insulated by a refractory lining 84, and leads to the exhaust piece 55.

The space 70 on the compressor side of the bearing block 8 is under compressor diffuser delivery pressure and is connected through the passages 72 and 73 to the space 71 on the side of the bearing block 8 adjacent the turbine rotor 1.

The interior of the bearing block 8 is isolated from the space 71 by the labyrinth gland 77, and from the compressor side by the labyrinth gland 78. Another labyrinth gland 76 seals the space 71 from the main gas stream emerging from the stator blades 75.

Figure 2:
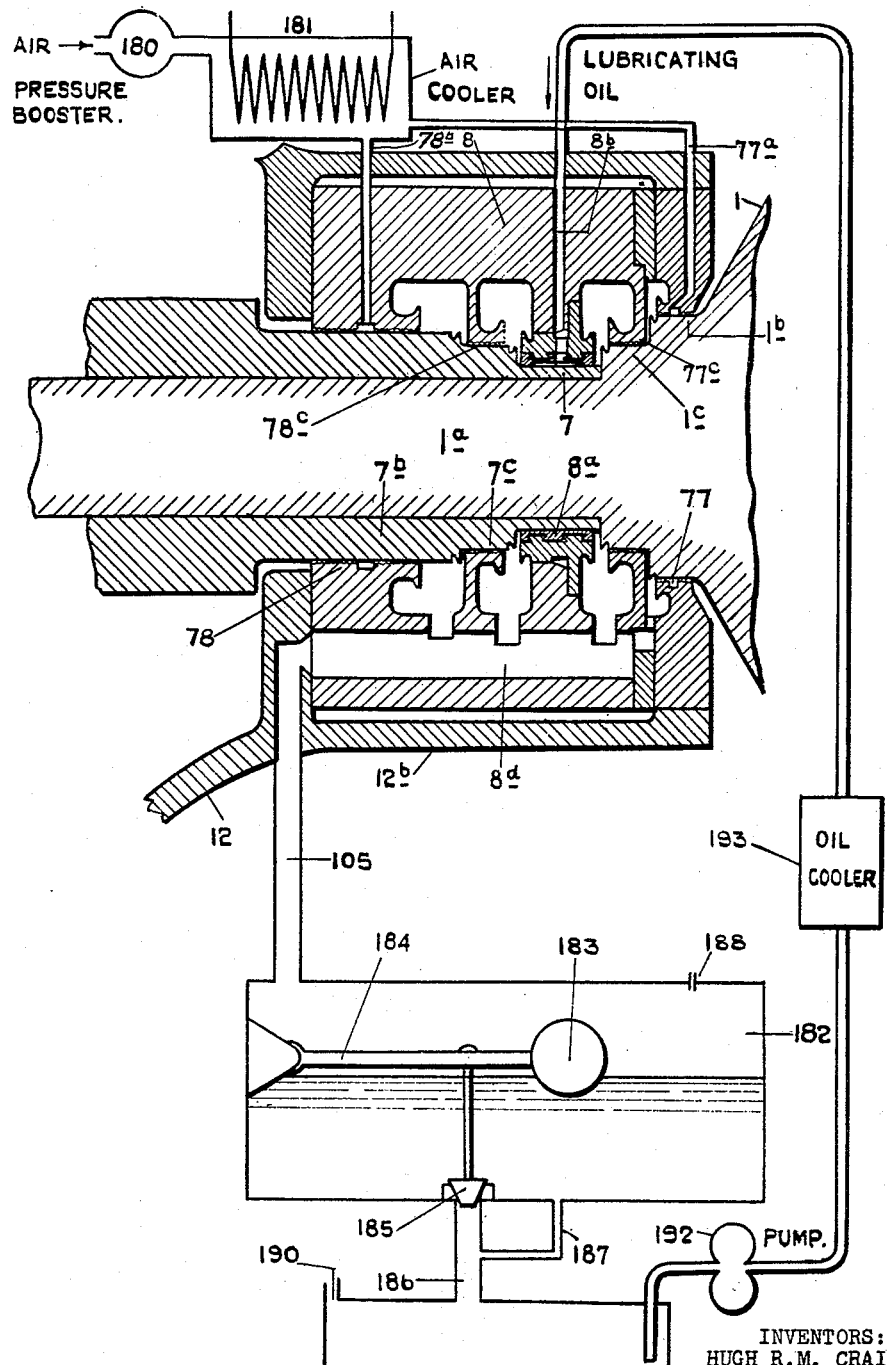
Fig. 2 is a diagrammatic vertical section through the main bearing for the compressor rotor and for the turbine rotor driving the same of such a gas turbine set, on a larger scale and with associated devices.

Referring now to Fig. 2, the rotor 1 of the compressor driving turbine is rigidly connected by means of an extension 1a with the tubular shaft 7 attached to the compressor rotor. This rotary assembly 1, 1a, 7 is journalled in a bearing proper 8a which is arranged inside a bearing block 8 which, in turn, is attached to the part 12b of the stator 12 of the gas turbine.

Oil under pressure is supplied to the bearing proper 8a through a duct 8b in the bearing block, and is drained off from one or more ducts 8d at the bottom of said block through a drain pipe 105 into an oil sump 182.

Air is supplied either from an outside source or preferably from the compressor of the gas turbine, if desired through a pressure booster 180 and/or a cooler 181, to channels 77a and 78b in the bearing block 8 which lead to the middle part of labyrinth glands 77, 78 respectively.

These glands isolate the inside of the bearing block 8, on both sides, from the surrounding space which is exposed to a pressure higher than atmospheric, equal to or slightly lower than the compressor delivery pressure. The inside of the bearing block 8 is in communication with the oil sump 1 and 2 through the duct 8d and drain pipe 105.

The oil level in the sump 182 is controlled within predetermined limits by any suitable known device such as a float 183 pivoted to the sump by means of a lever 184, to which a valve 185 is attached. This valve 185 separates the sump 182 from a pipe 186 leading to another sump 190 operating at a lower pressure, say at that of the ambient atmosphere to which it may be open at 191, from where the lubricating oil is eventually pumped back by a pump 192, cooled in a cooler 193 and fed back to the duct 8b. A restricted by-pass 187 may afford a permanent connection of the oil sump 182 to the pipe 186.

A calibrated leak 188 allows the controlled escape of air at a restricted rate from the sump 182.

It will be noted that another pair of labyrinth glands 77c, 78c is arranged inside the bearing block 8 at both sides of the bearing proper 8a, in juxtaposition to shoulders 1c, 7c respectively of the turbine rotor 1 and tubular shaft 7, respectively, which shoulders are equipped with oil thrower rings. These glands and oil thrower rings have the purpose of directing the lubricating oil emerging from the bearing proper 8a into the duct 8d before reaching the labyrinth glands 77, 78 which are further protected by thrower rings arranged on the shoulders 1b, 7b of the turbine rotor 1 and the tubular shaft 7, respectively.

It will be seen from the description of this embodiment of the invention that the calibrated air leak from the first sump ensures an inward flow of air through the glands isolating the inside of the bearing, thus making it more difficult for oil to escape out of the bearing through the said glands, particularly during sudden changes of the pressure outside the bearing. The air quantity lost through this leak may be made very small compared with the air loss through the glands which would occur if the oil sump would operate at ambient pressure. The air leak has the further advantage that if the drain pipe connecting the oil sump with the inside of the bearing becomes clogged, say due to oil foaming, the air will continue to leak out of the sump, thus rapidly reducing the pressure therein. The effect will produce an appreciable pressure difference across that pipe which will tend to blow it clear.

Figure 3:
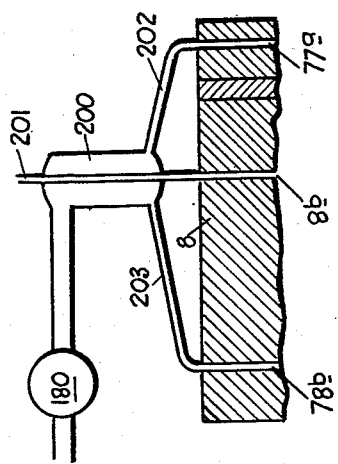
Fig. 3 shows a modified cooling arrangement.

Referring now to Fig. 3, an alternative cooler arrangement consists of a jacket 200 round the bearing oil inlet pipe 201 connected to duct 8b. The air from the booster 180 passing through said jacket 200 loses heat to the bearing lubricant and is thence led through pipes 202 and 203 to the air inlet channels 77a and 78b.

Figure 4:
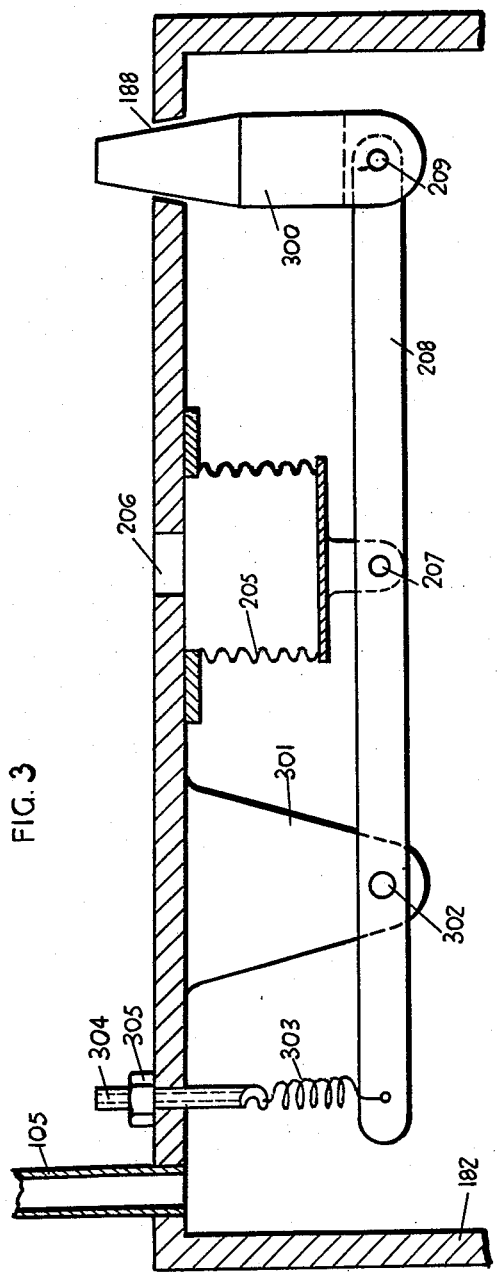
Fig. 4 shows a bellows controlled leak arrangement on a larger scale.

In Fig. 4 an alternative to keeping the calibrated air leak 188 permanently open to atmosphere is illustrated, according to which the pressure in the oil sump 182 is controlled by means such as bellows responsive to the delivery pressure of the gas turbine compressor. The air leak hole 188 in said oil sump 182 is shaped to take a conical valve 300 so that the movement up or down of said valve tends to reduce or increase the escape of air to atmosphere. Valve 300 is pivoted to a lever 208 by a pin 209. A lever 208 is pivoted to a fulcrum 301 fixed to said oil sump 182 through a fulcrum pin 302. Between valve 300 and fulcrum 301 a bellows device 205 is pivoted to the lever 208 through a pin 207 at one end and fixed to the oil sump 182 at the other end. An opening 206 in the oil sump cover connects the inside of said bellows to atmosphere.

An extension of lever 208 beyond said fulcrum 301 has a spring 303 attached for purposes of adjustment. The spring 303 is kept in tension by means of a hook 304 having its upper end threaded and adjusted by nut 305.

On an increase in compressor delivery pressure, the pressure in said oil sump 182 will increase and air will escape through the hole 188 thus tending to reduce the pressure in the sump 182. The initial increase in pressure will also act on said bellows 205 tending to compress them, which action moves valve 300 upwards by means of the motion of pin 207, lever 208 rotating about the fulcrum pin 302 and pin 209 causing a greater restriction in the air leak. The tension in said spring 303 is adjusted to control the movement of the valve 300 to a predetermined amount. On a fall in compressor delivery pressure the action of the control mechanism is the reverse to that described above.

Alternatively the leak 188 may be controlled by a device responsive to another characteristic of the gas turbine such as by a speed governor driven by the gas turbine.

What we claim as our invention and desire to secure by Letters Patent, is:

1. In a gas turbine set comprising a common casing, a compressor rotor and a turbine rotor directly coupled with one another: a bearing housing arranged between the said compressor rotor and turbine rotor, a plain bearing arranged inside said bearing housing between the said two rotors and journalling the same, an oil supply duct supplying lubricating oil to the said bearing, a source of compressed air in supply connection with the said bearing housing supplying the same with air at a superatmospheric pressure approximating the delivery pressure of the said compressor, a first oil sump container, duct means connecting the said bearing housing to the said first sump container and conducting oil and compressed air from the said bearing housing to the said first sump container, a calibrated air vent nozzle establishing restricted communication of the said first sump container to the open atmosphere, a second oil sump container open to the atmosphere, a drain duct connecting the oil space of the said first oil sump container to the said second oil sump container, a float operated valve controlling the said drain duct in response to the oil level in the said first oil sump container, and pumping means returning oil from the said second oil sump container to the said oil supply duct supplying lubricating oil to the said bearing.

2. In a gas turbine set as claimed in claim 1: an oil cooler connected between the said pumping means and the said supply duct to the said bearing.

3. In a gas turbine set comprising a common casing, a compressor rotor and a turbine rotor directly coupled with one another: a bearing housing arranged between the said compressor rotor and turbine rotor, a plain bearing arranged inside said bearing housing between the said two rotors and journalling the same, an oil supply duct supplying lubricating oil to the said bearing, a source of compressed air in supply connection with the said bearing housing supplying the same with air at a superatmospheric pressure approximating the delivery pressure of the said compressor, a first oil sump container, duct means connecting the said bearing housing to the said first sump container and conducting oil and compressed air from the said bearing housing to the said first sump container, a calibrated air vent nozzle establishing restricted communication of the said first sump container to the open atmosphere, a second oil sump container open to the atmosphere, a drain duct connecting the oil space of the first oil sump container to the said second oil sump container, an oil level responsive discharge means controlling the said drain duct in response to the oil level in the said first oil sump container, and pumping means returning oil from the said second oil sump container to the said oil supply duct supplying lubricating oil to the said bearing.

4. In a gas turbine set as claimed in claim 3: an oil cooler connected between the said pumping means and the said oil supply duct to the said bearing.

References Cited in the file of this patent

UNITED STATES PATENTS

| Number | Name | Date |
|---|---|---|
| 2,050,385 | Schmidt | Aug. 11, 1936 |
| 2,407,807 | Bentley | Sept. 17, 1946 |
| 2,484,275 | Eastman | Oct. 11, 1949 |
| 2,531,411 | Davenport | Nov. 28, 1950 |
| 2,610,786 | Howard | Sept. 16, 1952 |